United States Patent Office
2,899,292
Patented Aug. 11, 1959

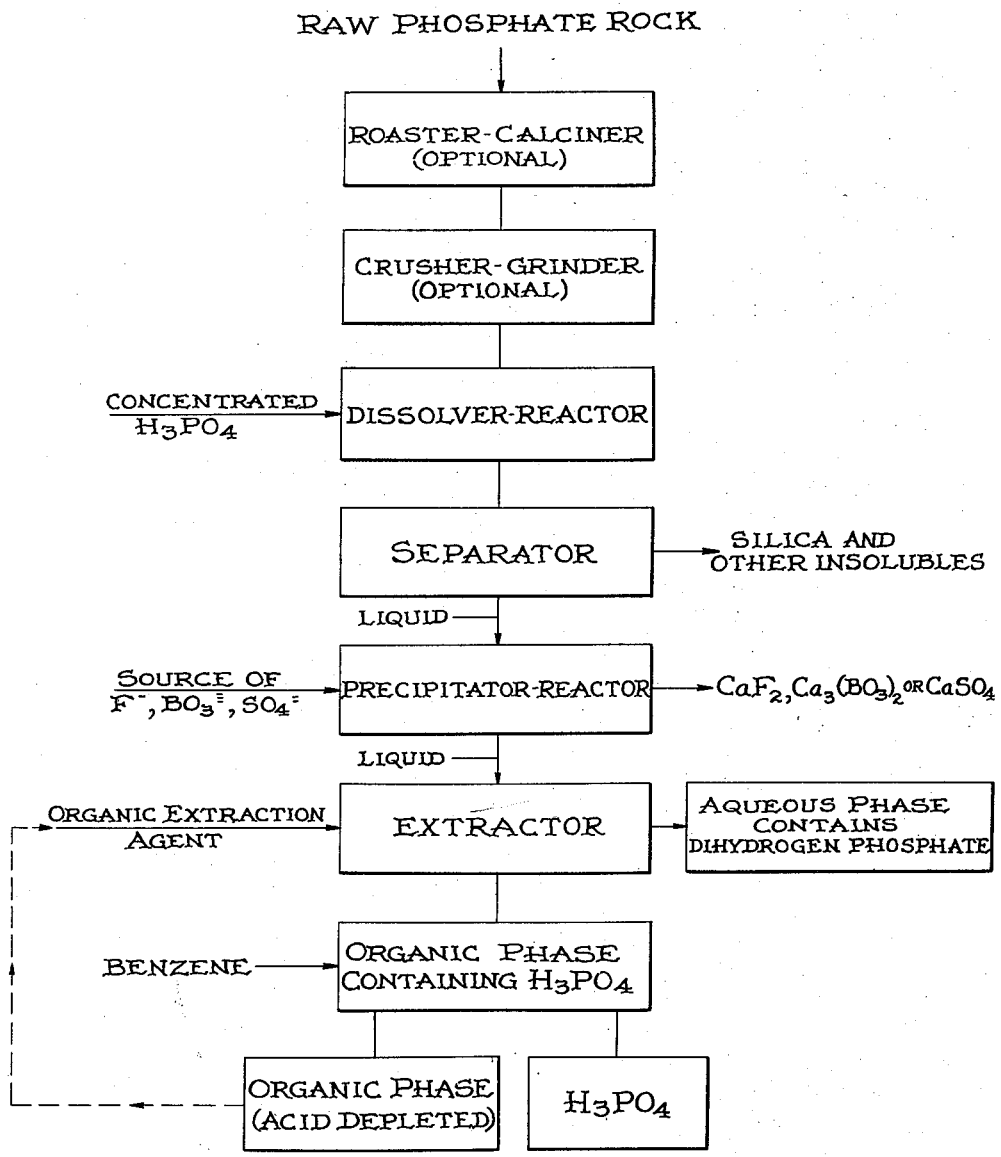

2,899,292

MANUFACTURE OF DIHYDROGEN PHOSPHATES

Ronald C. Vickery, Cleveland, Ohio, assignor to Horizons Incorporated, Princeton, N.J., a corporation of New Jersey Application January 26, 1956, Serial No. 561,680

11 Claims. (Cl. 71—41)

This invention relates to the conversion of crude, naturally occurring or by-product phosphate material, into one or more of the following recoverable valuable products: Silica, alkali metal or ammonium acid phosphates, and alkaline earth metal sulphates or fluorides or borates.

More particularly it relates to a process in which crude phosphate material is processed to produce preferably a phosphate of the group consisting of ammonium dihydrogen phosphate and alkali metal dihydrogen phosphates.

In its broadest espects the process involves decomposition of the crude phosphate material by means of strong phosphoric acid, e.g. 85% acid; separation of any insolubles; reaction of the solution with an acid from the group consisting of sulfuric, hydrofluoric and boric; and with an alkali metal compound of the same acid; separation of the resulting precipitated by-product; extraction of the remaining liquid with a suitable organic extraction agent to produce an aqueous phase containing the alkali metal- or ammonium-dihydrogen phosphate and an organic phase containing phosphoric acid, some water and the extraction agent; stripping of the phosphoric acid and return of same to the process; and recovery of the organic extraction agent for reuse in the process.

Crude phosphate materials have long been converted to superphosphate for agricultural purposes by the addition thereto of phosphoric acid. When the addition is made, the phosphate material usually sets into a hard rock-like mass as a result of a reaction between the phosphoric acid and the raw material. I have discovered that when a sufficient amount of concentrated phosphoric acid of appropriate strength is added to a crude phosphate material, virtually all of the raw material may be dissolved or converted into a water soluble product although when a more dilute phosphoric acid is used, only a portion of the phosphate material is dissolved or converted to a water soluble product.

In accordance with my invention I have found that when phosphorite was treated with a minimum of 1.8 times its weight of 85% acid, complete decomposition of the phosphorite was obtained, except for the silica present as an impurity. The maximum amount of phosphoric acid employed is determined only by economic considerations, since the reaction is not appreciably accelerated by the use of more acid than about 2.5 times the weight of the phosphorite. The phosphorite, of unknown origin, processed in the manner about to be more fully described, analyzed:

32.6% $P_2O_5$ (by weight)
7.21% $SiO_2$
48.3% CaO
0.26% MgO
1.46% $Fe_2O_3$
4.07% $Al_2O_3$
Less than 0.01% MnO The loss on ignition was 3%, due largely to $CO_2$. Spectrographic analysis showed that the material contained minor amounts of Na, Ti, Cr, Sr and U.

In the above phosphorite the ratio of $CaO:P_2O_5$ is about 3:1, but it should be clearly understood that my process is applicable to the treatment of any phosphate material having $CaO:P_2O_5$ ratios between 1.5:1 and 3.5:1. The process is particularly suited to the treatment of phosphates with a ratio of $CaO:P_2O_5$ of 1.9:1 to 2.5:1. This is in marked contrast with other patented processes such as that described in U.S. Patent 2,384,813 in which a phosphate rock, such as that amenable to treatment by my process, is converted to a stable compound having a $CaO:P_2O_5$ ratio ranging from 1:1 to 2:1 and then dissolved in concentrated phosphoric acid to form calcium metaphosphate, which is then treated with sulfuric acid to yield calcium sulfate as a precipitate and phosphoric acid.

In accordance with my invention, the phosphorite was roasted and the roasted product was ground to minus 100 (Tyler Standard) particle size. I have found that grinding to finer particle sizes produces no substantial change in the rate or completeness of solution of the phosphorite. It is also possible to use a somewhat coarser raw material in many instances. The finely divided product, most of which passes a 100 mesh screen (Tyler Standard), is treated with about twice its weight of phosphoric acid at an elevated temperature. Treatment at about 110° C. for about 2 hours has been found to be sufficient to convert the phosphate material to a product which is completely water soluble, except for the small amount of silica present in the original material, which is not affected by the treatment with concentrated phosphoric acid. The reaction product is a relatively thick slurry which on dilution with water yields a clear supernatant liquid, readily separable from the insolubles (e.g. silica). After the insolubles have been separated, the solution is reacted with an alkali metal or ammonium salt from the group consisting of alkali metal or ammonium sulphates, fluorides and borates. To render the process cyclic, with respect to the phosphoric acid, it is necessary to add hydrogen ions at this stage and this is preferably accomplished by addition of the acid corresponding to the alkali metal salt added. That is, sulfuric acid is added with a sulfate, HF with a fluoride or boric acid with a borate. As a result, the calcium salt of the added anion is formed and precipitates as $CaSO_4$, $CaF_2$ or $Ca_3(BO_3)_2$. The precipitate has been found to be readily separable from the mother liquor and it has been found that any phosphorus occluded by the precipitate may be easily removed by washing.

The mother liquor, combined with any liquid from the washings of the precipitate is extracted with an organic extraction agent, e.g. butanol in the manner described in U.S. Patents 1,929,441 and 1,929,442. The butanol extract contains the phosphoric acid and the aqueous phase contains the alkali metal or ammonium-dihydrogen phosphate. The latter is recovered from the aqueous phase by evaporation. The phosphoric acid is recovered from the butanol phase by extracting the butanol phase, to which has been added the mother liquor from which the dibasic phosphate has been recovered by crystallization, with any suitable aromatic hydrocarbon, for example with benzene. The benzene and butanol or other extraction agent are separated by azeotropic distillation. Both the phosphoric acid and butanol are returned to the process for reuse in the decomposition of the crude phosphorite and for extraction of the phosphoric acid, respectively.

The process is schematically shown in a drawing appended to this specification wherein a preferred procedure for carrying out my process to produce dihydrogen phosphates from crude phosphate materials is shown as a flow sheet.

The following specific examples will serve to further illustrate my process and are to be taken as illustrative of the process and some of the variations encompassed therein and are not to be considered as limitative.

*Example I*

One hundred parts by weight of roasted phosphorite were digested with about twice its weight of 85% phosphoric acid at about 100° C. At the end of two hours, decomposition appeared to be complete. The reacted mass was poured into a weight of water equal to about twice the weight of the original roasted phosphorite. The product was completely dissolved except for a residue of silica, amounting to about 6% of the original phosphorite. The silica was separated from the liquid by filtration and as recovered appeared to be suitable to the production of abrasive compositions. To the filtrate there was added 77.5 parts by weight of sodium sulphate. About 51.5 parts by weight of calcium sulphate was recovered by filtration. The calcium sulphate was easily filtered and produced a white finely divided product, useful as a filler for paper. The filtrate obtained when the calcium sulphate was separated was shaken with butanol. The aqueous phase was separated from the butanol phase, and evaporated, to yield 170 parts by weight of sodium dihydrogen phosphate. The mother liquor from which the dihydrogen phosphate was recovered was added to the butanol phase and the butanol phase was extracted with benzene. The butanol-benzene phase was separated from the aqueous solution of phosphoric acid which was returned to the process, after concentration. The butanol and benzene were separated by conventional techniques.

The above process may be represented by the following equation:

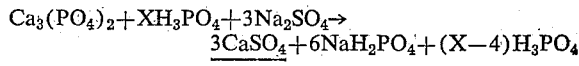

$$Ca_3(PO_4)_2 + XH_3PO_4 + 3Na_2SO_4 \rightarrow 3CaSO_4 + 6NaH_2PO_4 + (X-4)H_3PO_4$$

*Example II*

Example I was repeated except that instead of adding sodium sulphate to the solution of the decomposed phosphorite, both 32.1 parts by weight of sodium sulphate and 44.3 parts by weight of sulphuric acid were added to the decomposed phosphorite. In this manner, the process is rendered cyclic with respect to phosphoric acid, as follows:

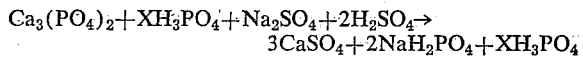

$$Ca_3(PO_4)_2 + XH_3PO_4 + Na_2SO_4 + 2H_2SO_4 \rightarrow 3CaSO_4 + 2NaH_2PO_4 + XH_3PO_4$$

It should be noted that the calcium sulphate produced by precipitation with both sodium sulphate and sulphuric acid appeared slightly whiter and of a much finer particle size than that of Example I.

*Example III*

Example II was repeated using sodium borate and boric acid to produce calcium borate and sodium dihydrogen phosphate as the recovered solid products.

*Example IV*

Example II was repeated using butyl acetate in place of the butanol to extract the phosphoric acid. The system showed a diminished tendency to emulsify than when shaken with butanol. The yields were otherwise comparable.

*Example V*

Example II was repeated with 57.7 parts by weight of NaF replacing the sodium sulphate and HF replacing the $H_2SO_4$. Calcium fluoride and sodium dihydrogen phosphate were recovered in almost quantitative yields.

*Example VI*

Example II was repeated, the reaction being carried out at 100° C. for 2½ hours. The reacted mass was poured into 520 parts by weight of water to effect complete dissolution of the reaction product except for 5.52 parts by weight of silica. 96 parts by weight of $CaSO_4$ was recovered as very fine white particles.

It will be appreciated by those skilled in the art that various changes may be made without departing from the spirit of my invention. Thus, instead of adding sodium salts, the corresponding ammonium, potassium or other alkali metal salts could be used to the same effect. Similarly instead of extracting with butanol, various other alcohols, aldehydes, ketones or ethers could be substituted without materially altering the process, and other aromatics than benzene may be used to back extract whichever extraction agent is chosen, with due regard for the partition coefficients and mutual solubilities of any group selected.

In addition, it will be also appreciated that phosphoric acids more or less concentrated than the 85% acid employed in the above examples may be used without materially changing the process, provided that a sufficient amount of acid is used to effect complete decomposition of the phosphate portion of the crude material being treated. In the following claims I have indicated that such amounts should be equivalent to a stated amount of 85% acid, and by this I mean to cover the use of strong phosphoric acids of from 60% to 100% concentration in amounts which provide the same total of hydrogen and phosphate to the process as that provided by the recited amount of 85% acid.

Furthermore while I have indicated that the alkali dihydrogen phosphate is recovered in a suitable form for use in detergent or other compositions, it may be found expedient to purify the product by one or more recrystallizations for specific uses where very high purity is required.

I claim:

1. A method of producing dihydrogen phosphates of the group consisting of alkali metal dihydrogen phosphates and ammonium dihydrogen phosphates which comprises: treating an alkaline earth phosphate-containing material at an elevated temperature with an amount of $H_3PO_4$ equal to that present in at least 1.8 times its weight of 85% $H_3PO_4$, said $H_3PO_4$ having a strength of between 60% $H_3PO_4$ and 100% $H_3PO_4$, the amount of said acid being sufficient to decompose the phosphate to a completely water soluble phosphate product; dissolving the said product in water; separating any insoluble residue from the solution formed; adding to the solution, an acid from the group consisting of sulphuric, boric and hydrofluoric and a salt of said acid from the group consisting of alkali metal and ammonium salts, whereby the alkaline earth salt of said acid is precipitated and phosphoric acid is regenerated; separating and separately recovering the precipitated alkaline earth salt and the phosphoric acid containing liquid; extracting the phosphoric acid from said separately recovered liquid by means of an organic extraction agent leaving an acid-depleted liquid; and evaporating the residual acid-depleted liquid to recover a dihydrogen phosphate therefrom.

2. A method of producing dihydrogen phosphates of the group consisting of alkali metal dihydrogen phosphates and ammonium dihydrogen phosphates which comprises: treating an alkaline earth phosphate with an amount of $H_3PO_4$ equal to that present in at least 1.8 times its weight of 85% of $H_3PO_4$, said $H_3PO_4$ having a strength of between 60% $H_3PO_4$ and 100% $H_3PO_4$, the amount of said acid being sufficient to decompose the phosphate to a completely water soluble phosphate product; dissolving the said product in water; separating any insoluble residue from the solution formed; adding to the solution, an acid from the group consisting of sulphuric, boric and hydrofluoric and a salt of said acid from the group consisting of alkali metal and ammonium salts, whereby the alkaline earth salt of said acid is precipitated and phosphoric acid is regenerated; separating and separately recovering the precipitated alkaline earth salt and the phosphoric acid containing liquid; extracting the phosphoric acid from said separately recovered liquid by means of an organic extraction agent leaving an acid-depleted liquid; evaporating the residual acid-depleted liquid to recover a dihydrogen phosphate therefrom; stripping the phosphoric acid from the organic extraction liquid, recovering the phosphoric acid stripped from the organic extraction liquid, and returning the phosphoric acid to the treatment of additional phosphate material.

3. The method of claim 2 in which the regenerated phosphoric acid is concentrated before being returned to the treating step.

4. The method of claim 2 in which the treatment is effected with 85% phosphoric acid.

5. A method of producing sodium dihydrogen phosphate which comprises: treating an alkaline earth phosphate-containing material with an amount of $H_3PO_4$ equal to that present in at least 1.8 times its weight of 85% $H_3PO_4$, said $H_3PO_4$ having a strength of between 60% $H_3PO_4$ and 100% $H_3PO_4$, the amount of said acid being sufficient to decompose the phosphate to a completely water soluble phosphate product; dissolving the said product in water; separating any insoluble residue from the solution formed; adding to the solution, an acid from the group consisting of sulphuric, boric and hydrofluoric and a sodium salt of said acid, whereby the alkaline earth salt of said acid is precipitated and phosphoric acid is regenerated; separating and separately recovering the precipitated alkaline earth salt and the phosphoric acid containing liquid; extracting the phosphoric acid from said separately recovered liquid by means of an organic extraction agent leaving an acid-depleted liquid; and evaporating the residual acid-depleted liquid to recover sodium dihydrogen phosphate therefrom.

6. A method of producing sodium dihydrogen phosphate which comprises: treating calcium phosphate-containing product with an amount of $H_3PO_4$ equal to that present in at least 1.8 times its weight of 85% $H_3PO_4$, said $H_3PO_4$ having a strength of between 60% $H_3PO_4$ and 100% $H_3PO_4$, the amount of said acid being sufficient to decompose the calcium phosphate to a completely water soluble phosphate product; dissolving the said product in water; separating any insoluble residue from the solution formed; adding to the solution, sulphuric acid and a sodium salt of said acid, whereby calcium sulphate is precipitated and phosphoric acid is regenerated; separating and separately recovering the precipitated calcium sulphate and the phosphoric acid containing liquid; extracting the phosphoric acid from said separately recovered liquid by means of an organic extraction agent leaving an acid-depleted liquid; and evaporating the residual acid-depleted liquid to recover sodium dihydrogen phosphate therefrom.

7. A method of producing sodium dihydrogen phosphate which comprises: treating calcium orthophosphate with about 1.8 times its weight of 85% phosphoric acid to decompose the orthophosphate to a completely water soluble product; dissolving the reaction product in water; separating any insoluble residue from the solution formed; adding to the solution sulphuric acid and a sodium salt of said acid, whereby calcium sulphate is precipitated and phosphoric acid is regenerated; separating and separately recovering the precipitated calcium sulphate and the phosphoric acid containing liquid; extracting the phosphoric acid from said separately recovered liquid by means of an organic extraction agent leaving an acid-depleted liquid; evaporating the residual acid-depleted liquid to recover the sodium dihydrogen phosphate therefrom; stripping the phosphoric acid from the organic extraction liquid by contacting same with a stripping agent and recovering the phosphoric acid stripped from the organic extraction liquid; and separating the stripping agent and the organic extraction agent and returning both to the process for reuse therein.

8. A method of producing dihydrogen phosphates of the group consisting of alkali metal dihydrogen phosphates and ammonium dihydrogen phosphates which comprises: treating an alkaline earth orthophosphate with at least about 1.8 times its weight of 85% phosphoric acid to decompose the orthophosphate to a completely water soluble product; dissolving the reaction product in water; separating any insoluble residue from the solution formed; adding to the solution an acid from the group consisting of sulphuric, boric and hydrofluoric and a salt of said acid from the group consisting of alkali metal and ammonium salts, whereby the alkaline earth salt of said acid is precipitated and phosphoric acid is regenerated; separating and separately recovering the alkaline earth salt and the phosphoric acid containing liquid; extracting the phosphoric acid from said separately recovered liquid by means of an organic extraction agent leaving an acid-depleted liquid; evaporating the residual acid-depleted liquid to recover a dihydrogen phosphate therefrom; stripping the phosphoric acid from the organic extraction liquid and recovering the phosphoric acid stripped from the organic extraction liquid; and returning the phosphoric acid to the process.

9. A method of producing dihydrogen phosphates of the group consisting of alkali metal dihydrogen phosphates and ammonium dihydrogen phosphates which comprises: treating an alkaline earth phosphate-containing material at an elevated temperature with an amount of $H_3PO_4$ equal to that present in at least 1.8 times its weight of 85% $H_3PO_4$, said $H_3PO_4$ having a strength of between 60% $H_3PO_4$ and 100% $H_3PO_4$ for a time sufficient to decompose the phosphate to a completely water soluble phosphate product; dissolving the phosphate product in water; separating any insolubles from the solution; adding to the solution, a salt of an acid of the group consisting of sulphuric, boric and hydrofluoric acids, from the group of salts consisting of ammonium and alkali metal salts, whereby the alkaline earth salt of said acid is precipitated; and recovering the dihydrogen phosphate present from the solution, after separation of the alkaline earth precipitate therefrom.

10. The method of claim 9 in which the concentrated phosphoric acid is about 85% $H_3PO_4$.

11. The method of claim 9 in which the alkaline earth phosphate is calcium phosphate, the acid is sulfuric acid and the calcium sulphate precipitate is also recovered as a separate product.

References Cited in the file of this patent

UNITED STATES PATENTS

| | | |
|---|---|---|
| Re. 19,045 | Larsson | Jan. 16, 1934 |
| 1,929,441 | Milligan | Oct. 10, 1933 |
| 2,567,227 | Miller | Sept. 11, 1951 |
| 2,680,679 | Harvey et al. | June 8, 1954 |
| 2,683,075 | Caldwell | July 6, 1954 |
| 2,759,795 | Archer | Aug. 21, 1956 |